US008443617B2

(12) United States Patent
Park

(10) Patent No.: US 8,443,617 B2
(45) Date of Patent: May 21, 2013

(54) REFRIGERATOR AND RAIL ASSEMBLY THEREOF

(75) Inventor: Jin-Woo Park, Changwon (KR)

(73) Assignee: LG Electronics Inc., Seoul (KR)

( * ) Notice: Subject to any disclaimer, the term of this patent is extended or adjusted under 35 U.S.C. 154(b) by 908 days.

(21) Appl. No.: 12/513,630

(22) PCT Filed: Nov. 1, 2007

(86) PCT No.: PCT/KR2007/005485

§ 371 (c)(1),
(2), (4) Date: Jul. 23, 2009

(87) PCT Pub. No.: WO2008/056910

PCT Pub. Date: May 15, 2008

(65) Prior Publication Data

US 2011/0162402 A1 Jul. 7, 2011

(30) Foreign Application Priority Data

Nov. 6, 2006 (KR) ........................ 10-2006-0109046

(51) Int. Cl.

| | |
|---|---|
| ***F25D 23/00*** | (2006.01) |
| ***F25D 3/00*** | (2006.01) |
| ***F25D 11/02*** | (2006.01) |
| ***F25D 23/02*** | (2006.01) |
| ***F25D 25/02*** | (2006.01) |
| ***B60H 1/32*** | (2006.01) |
| ***F25B 49/00*** | (2006.01) |
| ***F21V 33/00*** | (2006.01) |
| ***F27D 21/02*** | (2006.01) |

(52) U.S. Cl.
USPC .................. 62/264; 62/389; 62/332; 62/337; 62/265; 62/382; 62/133; 62/131; 62/302; 362/89; 362/133; 362/92; 362/94; 362/155

(58) Field of Classification Search
USPC .................. 62/389, 264, 332, 337, 265, 382, 62/133, 131, 302; 362/89, 133, 92, 94, 155
See application file for complete search history.

(56) References Cited

U.S. PATENT DOCUMENTS

| | | | | |
|---|---|---|---|---|
| 3,136,138 | A * | 6/1964 | Muffly | 62/404 |
| 5,193,356 | A * | 3/1993 | Ording et al. | 62/265 |
| 5,636,729 | A * | 6/1997 | Wiciel | 200/181 |
| 6,463,752 | B2 * | 10/2002 | Mandel et al. | 62/382 |
| 6,478,393 | B2 | 11/2002 | Kim et al. | |
| 7,430,937 | B2 * | 10/2008 | Rotter et al. | 74/422 |

FOREIGN PATENT DOCUMENTS

| | | | |
|---|---|---|---|
| CN | 1752696 | A | 3/2006 |
| JP | 2005-49093 | A | 2/2005 |
| KR | 20-1999-0021444 | U | 6/1999 |
| KR | 10-2002-0017015 | A | 3/2002 |
| KR | 10-0634361 | B1 | 10/2006 |
| WO | WO-2007/007950 | A1 | 1/2007 |

* cited by examiner

*Primary Examiner* — Frantz F. Jules
*Assistant Examiner* — Erik Mendoza-Wilkenfel
(74) *Attorney, Agent, or Firm* — Birch, Stewart, Kolasch & Birch, LLP

(57) ABSTRACT

Provided is a rail assembly fixed to the sides of a storage compartment of a refrigerator, with rail housings supporting rail members that insert and extrude a storage container, and a light source fixed to a rail housing to indicate whether a certain function is being performed in the storage compartment and function as a lamp that illuminates the inside of the storage compartment.

7 Claims, 2 Drawing Sheets

[Fig. 1]
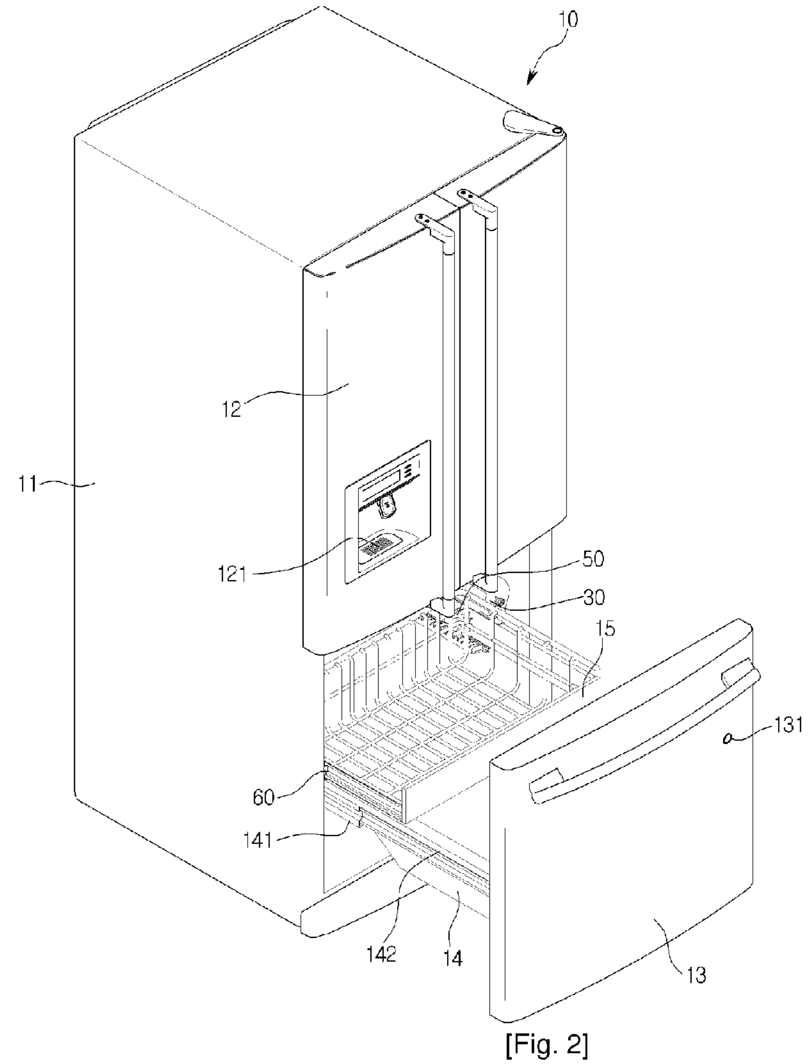
[Fig. 2]
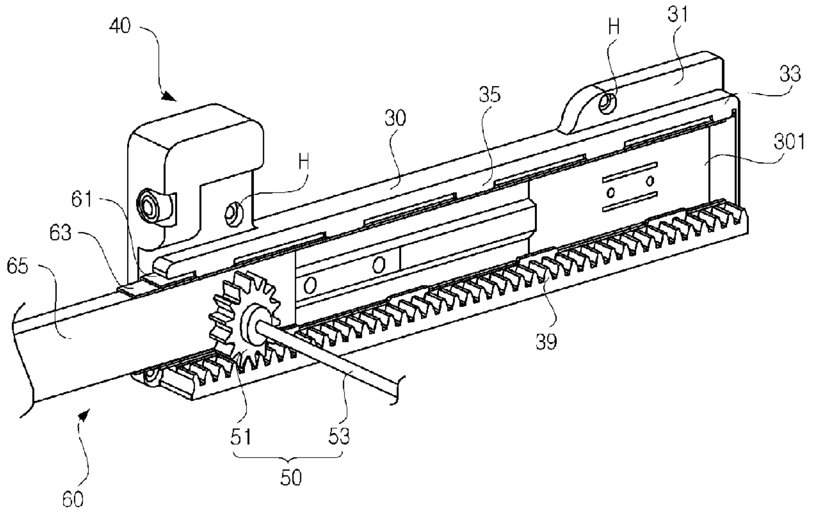

[Fig. 3]
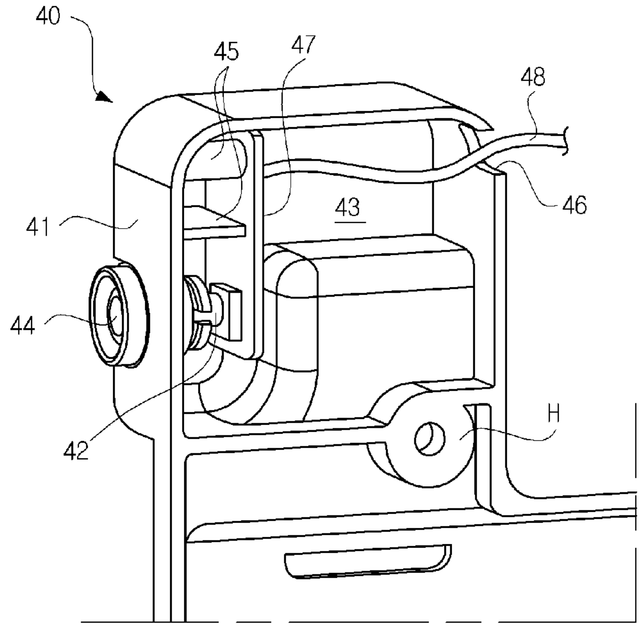
[Fig. 4]
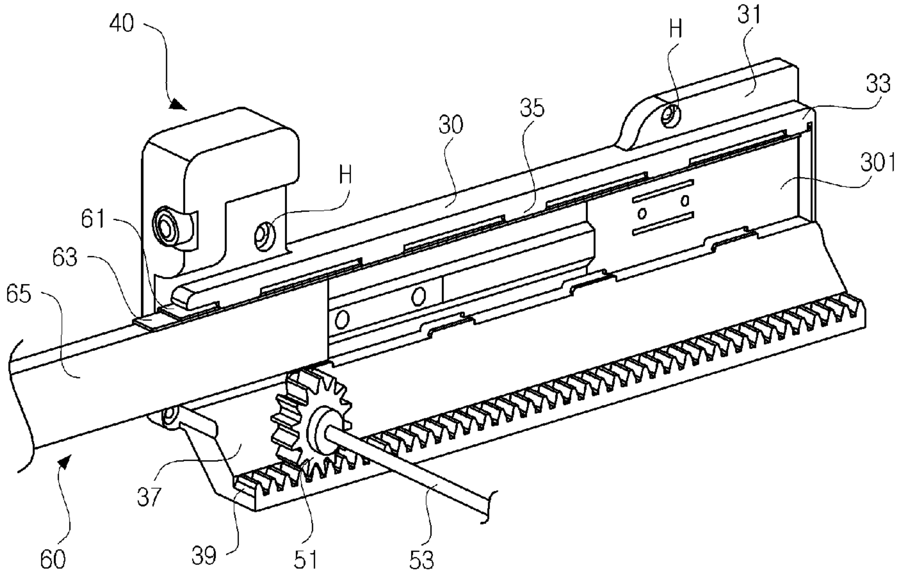

REFRIGERATOR AND RAIL ASSEMBLY THEREOF

TECHNICAL FIELD

The present disclosure relates to a rail assembly of a refrigerator.

BACKGROUND ART

In general, a refrigerator is divided into a refrigeration compartment that stores foods while keeping them fresh, and a freezer compartment that store foods in a frozen state. According to the location of its freezer compartment, a refrigerator can be classified as a side-by-side, top mount, or bottom freezer type refrigerator.

Recently, there has been an increase in demand for the bottom freezer type refrigerator that has its freezer compartment located at the bottom and its refrigeration compartment located at the upper portion.

A bottom freezer-type refrigerator is provided with double-sided doors for the refrigeration compartment, and a freezer compartment configured as a drawer to be inserted and extruded in forward and rearward directions. The freezer compartment includes a freezer drawer that holds frozen food products, and a separate storage box above the freezer drawer. The storage box and the drawer are both provided with rails allowing them to be slid in and out in forward and rearward directions.

The freezer drawer or the storage box may be provided with an anti-wobble mechanism at a rear thereof that prevents lateral wobbling of the freezer drawer or the storage box when they are slid in and out.

Specifically, the anti-wobble mechanism includes a shaft having a length corresponding to the width of the storage box or freezer drawer, and a rack coupled at each end of the shaft. A rail member that guides the sliding in and out of the freezer drawer or storage box is provided respectively at each sidewall of the freezer compartment. A pinion is formed extending horizontally inward from the side of a rail member. The pinion extends from the front to the rear of the freezer compartment. The rack is mounted on the pinion to prevent lateral wobbling of the freezer drawer or the storage box during their insertion and extrusion.

In the case of the above-described bottom type refrigerator according to the related art, the freezer compartment door and storage compartment are provided as drawer-type doors, so that when they are slid in or out forward or rearward, there is a limitation in installing a light emitting device that displays operating mode information at the front of the freezer door.

For example, an ultra-cold compartment may be provided in the freezer compartment, for keeping foods fresh by freezing them at extremely low temperatures. Because such ultra-cold compartments are sporadically used by most users, in order to save power, the need arises for being able to check from the outside whether an ultra-cold compartment is operating. In this case, the operation of the ultra-cold compartment may be checked through an indicator light on the front of the freezer compartment door. That is, if the ultra-cold compartment is operating, a light emitting device installed at the front of the freezer door may be turned on to indicate said operation. If a light emitting diode (LED) or other light emitting device is installed on the freezer compartment door, a cable connecting the power supply of the refrigerator to the light emitting device must be extended to the freezer door. In this case, the cable may be tangle or damaged when the freezer door is opened and closed. Moreover, a mechanism for extending or contracting the cable according to whether the freezer door is opened or closed is required, which is difficult to incorporate with the internal configuration of the freezer compartment.

To obviate the above limitations, the present disclosure provides a refrigerator that allows a user to discern through the front of the freezer door whether certain functions are operating within the freezer compartment.

In other words, a light emitting device that indicates whether certain functions are being performed is mounted within the freezer compartment, enabling a user to determine from the front surface of the freezer door whether the functions are in operation.

SUMMARY OF THE INVENTION

In one embodiment, a refrigerator includes: a main body provided with a storage space; a storage container drawably held within the storage space; at least one rail assembly guiding insertion and extrusion of the storage container; at least one rail housing mounted on a side surface of the storage container, to support the rail assembly; and a light source assembly provided on the rail housing, to emit light according to an operating state inside the storage space.

In another embodiment, a refrigerator includes: a main body provided with at least one storage space; a storage container held in the storage space; a door provided at a front of the storage container, to be drawn forward and backward together with the storage container; a pair of frames extending at a rear surface of the door; a pair of rail assemblies installed on the frames, to guide the door and the storage container to move back and forth; a rail housing mounted on wall surfaces of the storage space, the rail assemblies being extendably coupled to the rail housing; and a light source provided at one side of the rail housing, to emit light, wherein the light source is controlled to be turned on when a predetermined function is performed within the storage space or when the door is opened.

In a further embodiment, a rail assembly for a refrigerator includes: a rail housing fixed to a side surface of a storage space; a light source assembly provided on one side of the rail housing, to selectively emit light according to whether a certain function is being performed within the storage space or whether the storage space is open; and a rail member slideably provided on a mounting surface formed on a surface of the rail housing, to guide an insertion and extrusion of a storage container and a door.

A refrigerator and a refrigerator rail assembly according to embodiments of the present disclosure turn on a light emitting unit installed within the freezer compartment when an internal device such as an ultra-cold compartment provided within the freezer compartment is operating, and radiates light emitted by the light emitting unit through the front surface of the freezer door to the outside. Thus, a user can discern, through the light emitted from the front surface of the freezer door, whether the internal device within the freezer compartment is operating, elevating the level of user convenience.

Also, power consumption can be reduced by enabling discernment of the operating states of internal devices in the freezer compartment from the outside without having to open the freezer door.

Additionally, by fixing and mounting a light emitting device according to embodiments of the present disclosure on a rail housing, a separate light emitting device fixing structure is not required, thus reducing manufacturing cost.

Furthermore, the front surface of the freezer door may be effectively used.

BRIEF DESCRIPTION OF THE DRAWINGS

FIG. 1 is a perspective view of a refrigerator with a rail assembly according to embodiments of the present disclosure.

FIG. 2 is a perspective view of a rail assembly according to embodiments of the present disclosure.

FIG. 3 is a perspective view showing the internal configuration of a light source assembly provided on a rail assembly according to embodiments of the present disclosure.

FIG. 4 is a perspective view of a rail assembly according to other embodiments of the present disclosure.

DETAILED DESCRIPTION OF THE INVENTION

Reference will now be made in detail to the embodiments of the present disclosure, examples of which are illustrated in the accompanying drawings. Also, the spirit of the present disclosure is not limited to embodiments provided herein, and may be applied to a variety of other refrigerator configurations. That is, the present disclosure may apply equally to any refrigerator with a drawer type container and a door.

FIG. 1 is a perspective view of a refrigerator with a rail assembly according to embodiments of the present disclosure.

Referring to FIG. 1, a refrigerator 10 according to embodiments of the present disclosure includes a main body 11 with a refrigeration compartment and freezer compartment provided therein, a refrigeration door 12 provided to be capable of pivoting at the front of the main body 11, and a freezer door 13 that slides in and out of the main body 11 in forward and rearward directions.

The refrigeration compartment is provided at the upper portion of the main body 11, and the freezer compartment is provided below the refrigeration compartment. However, the spirit of the present disclosure is not restricted to the configurations provided herein.

In detail, a drawer 14 for storing foods to be kept frozen is installed behind the freezer door 13, and the drawer 14 is removably coupled to a frame 142 extending from either side at the rear surface of the freezer door 13.

A drawer rail 141 is installed to the outside of the frame 142, enabling the freezer door 13 and the drawer 14 to be inserted and extruded forward and rearward. The drawer rail 141 is coupled to both inner side surfaces of the freezer compartment.

A separate storage box may be further provided above the drawer 14. In the present embodiment, as shown in FIG. 1, a wire basket 15 will be exemplarily described as the storage box.

A transmitting window 131 may be formed on the front surface of the freezer door 13. The transmitting window 131 is formed to transmit light, generated by a light source (described below) of a light source assembly (described below) provided on a side surface of the freezer compartment, to the outside. The transmitting window 131 will be described in more detail below with respect to its form and function.

In detail, a basket rail 60 is provided on each side of the wire basket 15 described above, to allow the wire basket 15 to be inserted and extruded in forward and rearward directions. An anti-wobble member 50 is coupled at a rear end of the wire basket 15. The basket rail 60 is drawably coupled to a rail housing 30 that is fixed at either side surface of the freezer compartment.

FIG. 2 is a perspective view of a rail assembly according to embodiments of the present disclosure.

Referring to FIG. 2, a rail assembly according to the disclosed embodiments has a storage box, that is separate from the freezer drawer such as the above-described wire basket 15, installed thereon to be capable of being inserted and extruded in forward and backward directions. While the above-described wire basket 15 installed on the rail assembly is but one embodiment of the storage box, a variety of storage boxes other than the wire basket 15 may be mounted instead.

The rail assembly includes a basket rail 60 that guides the movement of the wire basket 15, and a rail housing 30 provided on the sides of the freezer compartment to support the basket rail 60.

In detail, the rail housing 30 is extendedly formed from front to rear at corresponding levels oppositely on both sides of the storage space such as the above-described freezer compartment or refrigeration compartment. To mount the basket rail 60 on a surface of the rail housing 30, a rail mounting surface 301 is formed. The rail mounting surface 301 is provided on the rail housing 30 in a shape with a recess portion of a predetermined depth, and the basket rail 60 is received in the recessed portion. Accordingly, the basket rail 60 and the rail housing 30 form virtually the same surface.

In further detail, a fastening piece 31 is provided on top of the rail housing 30, and a fastening hole H is formed through the inner and outer portions of the fastening piece 31. A screw is inserted through the fastening hole H to fix the rail housing 30 to a side of the storage space.

Also, a rail supporting portion 33 is formed on the upper and lower ends of the rail mounting surface 301. The rail supporting portion 33 is a part of the rail housing 30, and is formed by the rail mounting surface 301 being recessed a predetermined depth. Thus, the rail supporting portion 33 supports the upper and lower ends of the basket rail 60 mounted in the rail mounting surface 301.

A plurality of disengagement preventing tabs 35 is formed to protrude on the rail supporting portion 33 at predetermined intervals. That is, the disengagement preventing tabs 35 protrude from the upper and lower rail supporting portions 33 of the rail housing 30 in mutually facing directions, to prevent the basket rail 60 disengaging from the rail housing 30.

A rack 39 extends from the side of the rail supporting portion 33 provided at the lower end of the rail housing 30. The rack 39 extends for a length corresponding to the rail housing 30, retaining a horizontal disposition. An anti-wobble member for preventing lateral wobbling of the wire basket 15 is mounted on the rack 39.

Specifically, the anti-wobble member 50 includes a shaft 53 that extends for a length corresponding to the width of the wire basket 15, and a pinion 51 rotatably coupled at either end of the shaft 53. The pinion 51 is mounted on the rack 39 and engaged by gears thereto. Therefore, in the insertion and extrusion of the wire basket 15, the pinion 51 rotates along the rack 39 to move forward and backward.

The basket rail 60 mounted on the rail mounting surface 301 includes a fixed rail 61 fixed to the rail housing 30, a guide rail 63 capable of extending from the fixed rail 61, and a moving rail 65 coupled to be capable of extending from the guide rail 63. The basket rail 60 is respectively provided at either side of the storage space. By extendably coupling a plurality of rail members to the basket rail 60, the wire basket 15 can be extruded from the storage compartment. Here, there are two rails extendably installed on the fixing rail 61; however, the number of rails may differ according to the horizontal depth of the freezer compartment.

In detail, the fixed rail 61 is formed to have a "c"-shaped cross section. The open portion faces the central portion of the storage compartment. In other words, the perpendicular portion of the fixed rail 61 is pressed against the rail mounting surface 301.

The guide rail 63 is provided to the inside of the fixed rail 61. The guide rail 63 also has a "c"-shaped cross section, and is installed on the fixed rail 61 so that the open portion thereof also faces the central portion of the storage space. The guide rail 63 is inserted and extruded forward and backward along the fixed rail 61.

The moving rail 65 is provided to the inside of the guide rail 63. The moving rail 65 is guided by the guide rail 63 to move in and out. Thus, the basket rail 60 is capable of being inserted and extruded in stages through the plurality of rail members. The moving rail also has a "c"-shaped cross section, and is mounted on the guide rail 63 with its open portion facing the walls of the storage compartment. It should be noted, however, that the coupling method of the plurality of rails is not limited hereto.

The light source assembly 40 is provided on top of the rail housing 30.

The form and function of the light source assembly 40 will be described in detail below, with reference to the diagrams. Here, the rail assembly on which the light source assembly 40 is provided is not limited to being a rail assembly for a wire basket 15. That is, it may be embodied as a drawer rail assembly for guiding the insertion and extrusion of a freezer drawer. The light source assembly 40 may be applied to any type of rail housing that supports a rail assembly.

FIG. 3 is a perspective view showing the internal configuration of a light source assembly provided on a rail assembly according to embodiments of the present disclosure.

Referring to FIG. 3, a light source assembly 40 according to embodiments of the present disclosure includes a light source housing 41 and a light emitting device held within the light source housing 41.

The light source housing 41 may be formed integrally with the rail housing 30 to extend further upward from the top of the rail housing 30. Alternatively, the light source housing 41 may be a separate component that is coupled to the rail housing 30.

In detail, the light source housing 41 includes a light source mounting space 43 formed within. A light source 42 (described below) is provided in the light source mounting space 43. A substrate holder 45 is also provided in the light source mounting space 43. The substrate holder 45 supports a substrate 47 (described below), and is provided in duplicate in FIG. 3, where the two substrate holders are spaced a predetermined distance from one another. The substrate holder 45 extends from the inner surface of the light source housing 41, and fixes the substrate 47 at a distance apart from the inner surface of the light source housing 41. Therefore, heat generated from the substrate 47 is not directly transferred to the light source housing 41.

The light source 42 is provided directly on a surface of the substrate 47.

Specifically, the substrate 47 controls the light source 42, and turns the latter on and off according to whether a certain function inside the freezer compartment is operating. For example, if the ultra-cold compartment in the freezer compartment is operating, the light source 42 may be switched on. The light source 42 is provided as an organic LED (OLED) or similar light emitting device. The light source 42 is mounted to the substrate 47 through soldering. When the light source 42 is electrically connected to the substrate 47, the substrate 47 controls the operation of the light source 42.

A lens 44 is provided on a side of the light source housing 41 opposite the installed location of the light source 42. That is, the lens 44 performs the function of emitting the light generated by the light source 42 to the outside. A wire through-hole 46 is formed in a surface of the light source housing 41, and a wire 48 connected to the substrate 47 is passed through the wire through-hole 46 and wired to the outside of the light source housing 41. The wire 48 wired to the outside is passed through a surface of the storage compartment 11 and connected to the main controller of the refrigerator.

The transmitting window 131 described above will be described in further detail below.

The transmitting window 131, allowing light generated by the light source 42 to pass through and be visible from the outside, is formed on the freezer door 13.

That is, a hole may be formed in a front-to-rear direction in the freezer door 13. The front and rear ends of the hole may respectively have transparent glass or plastic transmitting windows 131 installed thereon. The transmitting window 131 seals the hole, preventing the cold air inside the freezer compartment from leaking to the outside. By forming the transmitting window 131 with a transparent material, the light emitted from the light source 42 is transmitted to the outside of the freezer compartment. The transmitting window 131 is formed directly ahead of the lens 44 to transmit light emitted forward to the outside.

Also, in the above embodiments, the light source 42 and lens 44 are disposed toward the freezer door 13 in a configuration that rendering light visible from the outside. In pertinent embodiments, the light source 42 may be disposed toward the center of the freezer compartment, in order to function as an interior lighting lamp for the freezer compartment.

In detail, in a freezer compartment of a bottom freezer type refrigerator, a storage container like the wire basket is often installed at the upper portion of the freezer compartment in addition to the freezer drawer 13. For example, instead of a wire basket, a hexahedral translucent plastic container may be installed, an icemaker may be installed to one side of the container, and an ultra-cold compartment or general freezer storage container may be formed on the other side.

When the storage container installed at the ceiling portion of the freezer compartment is formed of an opaque material, the lamp that illuminates the interior of the freezer compartment cannot be installed on the ceiling of the freezer compartment. That is, the lamp on the ceiling of the freezer compartment cannot light the contents of freezer compartment due to the opaque storage compartment. Also, in order to mount the light source assembly 40 directly to a sidewall of the freezer compartment, the surface of the freezer compartment wall must be bored, creating the possibility of cold air leakage. Further, during the process of foaming the inner walls of the freezer compartment, particles of insulating material may scatter.

Therefore, when the light source 42 that functions as a lamp is provided on the rail housing 30, not only can the inside of the freezer compartment be easily lighted, but the process of wiring is made easier.

The operation of the above-configured light source assembly 40 will be described.

In the case where the light source assembly 40 is used as a means to indicate the operation of a certain function in the freezer compartment, when the certain function operates, the light source 42 is turned on to emit light. The emitted light passes through the lens 44 and is focused in a straight path. With the freezer door 13 closed, the light passes through the transmitting window 131 to the outside. Accordingly, a user can check whether the certain function is operating in the freezer compartment without opening the freezer door.

When the light source assembly 40 is provided as a means to light the inside of the freezer compartment, the light source 42 of the light source assembly 40 is switched on as soon as the freezer door 13 is opened. Thus, when a user pulls the freezer door 13, the light source 42 is switched on to illuminate the inside of the freezer compartment. Here, a sensor is installed on the rear surface of the freezer door 13 and the front surface of the main body 11, so that the moment the freezer door 13 is opened, the opened state may be detected and the detection signal may be sent to the main controller. The main controller then sends an 'on' signal to the light source assembly to switch the light source 42 on. When the light source assembly 40 is provided as a lamp, the light source assembly 40 may be positioned at the approximate center of the rail housing 30.

FIG. 4 is a perspective view of a rail assembly according to other embodiments of the present disclosure.

Referring to FIG. 4, the present embodiment provides the rack 39 on the free edge of a rack connecting portion 37 extended downward from the rail supporting portion 33, while other aspects are the same as in the above embodiments.

In detail, the rack connecting portion 37 extends at a predetermined slant or directly downward from the bottom of the rail supporting portion 33 provided below the rail housing 30, and has the rack 39 provided on the free edge thereof, so that the installed position of the anti-wobble member 50 can be lowered. The anti-wobble member is mounted at the rear, lower end of the wire basket. Due to the lowered position of the anti-wobble member 50, the vertical height of the wire box 15 can be extended, thereby increasing the storage capacity of the wire box.

The invention claimed is:

1. A refrigerator, comprising:

a main body provided with a storage space;

a door opening and closing the storage space;

a storage container installed behind the door;

a pair of rails extendably coupled with the storage container to guide an insertion and extension of the door and the storage container;

a pair of rail housings mounted on both side surfaces of the storage container to support the rails; and a light source assembly formed integrally with one of the rail housings above the storage container to emit light toward the storage container, wherein the light source assembly is switched on to illuminate the storage container when the door and the storage container are drawn out of the storage space; and wherein the light source assembly comprises:

a light source housing; a light source held in the light source housing, to emit light according to the operating state inside the storage space;

a lens provided on a surface of the light source housing, to emit the light emitted by the light source to an outside; and a substrate installed in the inside of the light source housing, to control an operation of the light source.

2. The refrigerator according to claim 1, wherein the light source assembly is disposed at a front end of the rail housing.

3. The refrigerator according to claim 1, further comprising a transmitting window formed on the door at a location corresponding to the light source.

4. The refrigerator according to claim 1, wherein the substrate is installed at a distance apart from a wall of the light source housing.

5. The refrigerator according to claim 1, further comprising: a rack gear provided at a lower end of each of the rail housings to extend along a length of each of the rail housings; and an anti-wobble member installed transversely at a rear end of the storage container and mounted on the rack gear, to prevent the storage container from wobbling when the storage container is drawn in and out.

6. The refrigerator according to claim 5, wherein the rack gear is provided on the same surface as a bottom end of each of the rail housings.

7. The refrigerator according to claim 5, wherein the rack gear is provided at a position lower than a bottom end of each of the rail housings.

* * * * *